(12) United States Patent
Rodríguez Ochoa et al.

(10) Patent No.: US 12,497,085 B2
(45) Date of Patent: Dec. 16, 2025

(54) HANDBRAKE MECHANISM FOR RAILWAY WAGONS AND STEERING WHEEL FOR A HANDBRAKE MECHANISM FOR RAILWAY WAGONS

(71) Applicant: STUCKI DE MEXICO S. DE R.L. DE C.V., Monterrey (MX)

(72) Inventors: Arsenio Rodríguez Ochoa, Monterrey (MX); Jorge Alberto De la Fuente Farías, Monterrey (MX)

(*) Notice: Subject to any disclaimer, the term of this patent is extended or adjusted under 35 U.S.C. 154(b) by 1257 days.

(21) Appl. No.: 17/267,151

(22) PCT Filed: Aug. 9, 2018

(86) PCT No.: PCT/MX2018/050018
§ 371 (c)(1),
(2) Date: Sep. 12, 2021

(87) PCT Pub. No.: WO2020/032787
PCT Pub. Date: Feb. 13, 2020

(65) Prior Publication Data
US 2021/0403058 A1 Dec. 30, 2021

(51) Int. Cl.
*B61H 13/04* (2006.01)
*B61H 13/00* (2006.01)

(52) U.S. Cl.
CPC .................. *B61H 13/04* (2013.01)

(58) Field of Classification Search
CPC ..................................................... B61H 13/04
See application file for complete search history.

(56) References Cited

U.S. PATENT DOCUMENTS

| | | | | |
|---|---|---|---|---|
| 2,000,089 A * | 5/1935 | Miller | ............... | B61H 13/04 74/505 |
| 2,166,201 A * | 7/1939 | Cleave | ............... | B61H 13/04 192/16 |
| 2,272,437 A * | 2/1942 | Smith | ............... | B61H 13/04 74/505 |
| 3,988,944 A * | 11/1976 | Klasing | ............... | G05G 1/08 74/505 |
| 2010/0062900 A1* | 3/2010 | Michel | ............... | B61H 13/04 477/171 |
| 2016/0200296 A1* | 7/2016 | Wright | ............... | B60T 17/228 303/3 |

FOREIGN PATENT DOCUMENTS

| | | | | |
|---|---|---|---|---|
| CN | 103963800 A * | 8/2014 | ............... | B60T 7/10 |
| DE | 202005015316 U1 * | 1/2006 | ............... | A61G 5/023 |
| WO | WO-2020032787 A1 * | 2/2020 | ............... | B61H 13/04 |

* cited by examiner

*Primary Examiner* — Melody M Burch
(74) *Attorney, Agent, or Firm* — PatShegen; Moshe Pinchas (57) ABSTRACT

A handwheel-actuated, extreme low-profile parking brake mechanism for railway cars, which can be housed in a housing that together with the handwheel does not exceed a width of 6¼ from the side surface of the car, in this way it meets the requirements of the applicable normative specification defined by the same AAR association and by the FRA regulations, thus fitting into the reduced space available for this brake mechanisms on one side of the railway car.

9 Claims, 4 Drawing Sheets

HANDBRAKE MECHANISM FOR RAILWAY WAGONS AND STEERING WHEEL FOR A HANDBRAKE MECHANISM FOR RAILWAY WAGONS

BACKGROUND OF THE INVENTION

A. Field of the Invention

The present invention relates to railroad car parking brake mechanisms, and more particularly, to a lever-type low profile parking brake mechanism to be installed on the side of a railroad car.

B. Description of Related Art

The parking brake mechanisms for railway cars are used to immobilize them when they are parked, preventing them from moving and causing an accident.

These manually applied brakes include brake shoes positioned to press the wheels of the rail car. When the car comes to a stop, the brake is adjusted by manually turning a parking brake handwheel or a lever that moves a ratchet mechanism that pulls an endless chain by turning a ratchet-controlled drum to move the brake shoes in and out the wheels of the car.

This type of parking brake mechanism is normally equipped with a release lever that releases the ratchet mechanism so that releasing the tension of the chain causes the brake shoes to stop pressing and releases the wheels of the rail car. Also, some parking brake models traditionally feature gradual release of the brakes through the handwheel when turning in reverse.

Most existing parking brake mechanisms are installed at the ends of railway cars, there are several models, depending on the car type and the customer's need, among which there is the so-called Group N brake (brake N), however, there are also mechanisms that are installed on the sides of railroad cars.

A typical hand mechanism for this application is the lever parking brake of the so-called "T" group (T-Brake) which is commonly used in freight cars for automobile transport services or called Autoracks.

This T-Brake model, as already mentioned, is normally installed on one side of the Autorack car due to the Autorack design, which does not allow the necessary access space at the front end of the car, called Side A, which is the space where the typical N-Brake is traditionally installed. The installation location at the side of the car, the height of the mechanism and its method of actuation of the T-brake, causes the following disadvantages for the customer:
   a. The mechanism is installed at a great height, and the fact of being of the lever type implies that, for its operation, the operator requires in certain track circumstances, to climb the adjacent vertical ladder of the car, and operate the lever in multiple times from such position, to eventually allow the application of the parking brake. This causes safety risks for the personnel who carry out this task, and has been cause of multiple accidents, being in many cases the main cause of accidents in this type of car.
   b. The operation of the group T parking brake consists of stretching the chain of the brake system by actuating the lever, until achieving the compaction of all its brake elements, in its four axes, and subsequently applying the necessary force to exert the friction required between the shoes and the wheels to immobilize the car and prevent its movement on the train track it is parked on. This involves the actions of first winding the chain to collect the extra slack from the chain, which has a total 18-inch stroke, which varies to compensate for the difference between the "new" and "worn" condition of the chain brake system, including the condition of all its elements to be compacted, such as wheels, brake shoes, bolts, levers and brake beams, and finally applying the braking force. The process of picking up the chain slack requires no more than a slight force, but given its stroke length, it involves repetitive actuation of the lever many times, consuming train operation time, and exposing the operator to fatigue and risks of falling in each event.
   c. Finally, when the moment comes to apply the necessary force to apply the braking, the operator depends on a single arm to exert the full force, during several applications of the lever, hanging his weight and the stretching force on his other arm to sustain, exert force and maintain balance in such heights during the entire process. The sudden change in force, the unexpectedness of it, and the incremental force required, cause most of the falls, injuries and accidents of the operator during the use of this parking brake mechanisms.
   d. The way to release the parking brake once applied to the railway car is by means of a quick release or unlocking of the mechanism, by means of a short lever designed for this effect and which is part of the T-Brake, located in the upper part of the same T parking brake, and for which there are two options to carry out this action, 1st. climb the ladder again and do it by hand, or 2nd. using a bar or portable extension mechanism, which the operator must carry prior to his intention to release the car's parking brake, directly standing on the floor next to the side of the car, with said extension pointing it and putting it in contact with the short T brake release lever, and from such position, pushing upwards until the brake is released and unlocked. This release operation is sudden and noisy, due to the tension exerted on the brake mechanism, which acts like a spring, suddenly releasing the great tension applied to the elements of the brake system.

Either of these two release processes represents a loss of time and risks for both the operator and the personnel who are in contact or close to the brake system, during said sudden release due to the consequent jump of its previously tensioned elements.

Space Restrictions.

The space to install the brake mechanism on the side of the Autorack is limited by the restrictions of the movement of the train through tunnels and bridges, and also because it represents a risk of being caught by branches, objects and even as a risk for people and animals that approach the moving train. That's the reason the use of typical handwheel brake is never considered for Autoracks, and the low profile T-Brake is used in Autoracks.

However, there is a need for an even thinner parking brake than can be able to occupy the space already existing in aging Autoracks, which today already have installed the T-Brake, and which are susceptible to replacement by a handwheel type brake mechanism that could replace them, but within the space it already occupies, in order to solve the above mentioned safety problems.

In view of the above referred need, the applicant developed an extreme low profile handwheel parking brake mechanism for railway cars which replaces the T-brake.

Thanks to the reduced number of components and the configuration of said components, the parking brake mechanism of the present invention has such a thickness that it can be housed in a casing that does not exceed 4 inches in width from the side surface of a railway car, while meeting the requirements of force and chain stroke length, in addition to meeting the requirements of the applicable normative specification defined by the same AAR association and FRA regulations.

The parking brake mechanism of the present invention fits into the new reduced space assigned for this brake on the same side of the car, but operated by a handwheel, instead of a lever, which allows the application of the parking brake while the operator is standing on the ground, using both hands to exert adequate force and without the risk of falling. Also, the application of the parking brake is many times faster, since the take-up of the loose chain is facilitated by turning the handwheel, which acts as an inertia wheel, so that in a couple of handwheel strokes a continuous turn is achieved for the rapid winding of the loose chain, and the subsequent application of the braking force with both hands, from the ground.

Additionally, the parking brake mechanisms of the present invention may include a long design quick-release lever, which allows the operator to release the brake by hand, from the ground, without the need to get on the train or use a special extension. for this purpose.

Finally, the handwheel of the parking brake mechanisms of the present invention can include a rear guard that protects the operator's fingers as he inserts his fingers between the spokes of the handwheel to make it turn, preventing the fingers from being trapped between the fingers. spokes of the handwheel and the outer face of the parking brake housing.

Thanks to the specific configuration of the parking brake mechanism of the present invention and of the handwheel guard, it is possible to provide a casing and a handwheel that together, do not exceed 6¼ inches in width from the side surface of the car, thus complying with the requirements of the applicable normative specification defined by association AAR and by the FRA regulations, fitting in the reduced space available for the parking brake mechanism on the same side of the car.

SUMMARY OF THE INVENTION

It is a main object of the present invention to provide a parking brake mechanism for railway cars which is installed on the side thereof, thus replacing the T-brake.

It is another main object of the present invention to provide a parking brake mechanism of the above described nature, which meets the same requirements for force, chain stroke length, and necessary force as the T-brake.

It is a further object of the present invention, to provide a parking brake mechanism of the above described nature which meets the requirements of the applicable normative specification defined by the same AAR association and by the FRA regulations, fitting in the reduced space available for the hand brake mechanism on the same side of the car.

It is a further object of the present invention, to provide a parking brake mechanism of the above described nature which is operated by a handwheel instead of by a lever which allows the application of the parking brake of the car while the operator is standing on the ground, and using both hands to exert adequate force and without the risk of falling, Also, the application of the parking brake is many times faster, since the take-up of the loose chain is facilitated by turning the handwheel, which acts as an inertia wheel, so that in a couple of handwheel strokes a continuous turn is achieved for the rapid winding of the loose chain, and the subsequent application of the braking force with both hands, from the ground.

It is another object of the present invention to provide a parking brake mechanism of the above described nature which has a quick-release lever of long design, which allows the operator to release the brake by hand, from the ground, without the need to get on the train or use a special extension for this purpose.

It is still a further object of the present invention, to provide a parking brake mechanism of the above described nature, which may include a rear guard that protects the fingers of the operator as he inserts his fingers between the spokes of the handwheel to rotate it, preventing fingers from being caught between the spokes of the handwheel and the outer face of the parking brake housing.

It is still a main object of the present invention, to provide a parking brake mechanism of the nature described above, in which, thanks to the specific configuration of the parking brake mechanism of the present invention and of the handwheel guard, it is possible to provide a housing and handwheel that together do not exceed 6¼ inches in width counted from the lateral surface of the car, thus meeting the requirements of the applicable normative specification defined by the same AAR association and by the FRA regulations, fitting into the reduced space available for the parking brake mechanism on the same side of the carriage.

These and other objects and advantages of the present invention will become apparent to those of ordinary skill in the art from the following detailed description of the invention.

DETAILED DESCRIPTION OF THE INVENTION

The extreme low-profile parking brake mechanism for railway cars of the present invention comprises, in its most general embodiment, the following elements:

a casing with a rear cover that forms an internal cavity that has internal walls and a mechanism housed within said internal cavity, wherein the mechanism allows applying a tension to a chain connected to the brake mechanism of a railroad car, wherein said mechanism comprises:

a main gear;

a ratchet mechanism that can be rotated from the outside of the housing in a single direction only, by means of a handwheel, wherein said ratchet mechanism is functionally attached to the internal walls of the cavity, said mechanism ratchet having a ratchet gear meshing with the main gear;

a clutch mechanism associated with the ratchet mechanism, and which can rotate together with the ratchet mechanism, said clutch mechanism having a connecting plate that is normally engaged with the ratchet gear;

a release mechanism for pushing the connecting plate of the clutch mechanism and releasing the main gear of the ratchet mechanism;

a rotating drum normally in contact and associated with the ratchet mechanism through the clutch mechanism and attached to the main gear, wherein one end of the chain is attached to the rotating drum, around which it is wound, thus tensioning the entire chain and actuating the brake mechanism connected to an opposite end of the chain;

wherein when the main gear rotates, all the components associated with it rotate, specifically the clutch mechanism and the drum mechanism;

wherein the ratchet mechanism associated with the clutch mechanism and the drum mechanism allows said mechanism to rotate in one direction by winding the chain on it and applying tension to the chain and applying the brake mechanism of the railroad car, preventing it from release; and wherein by applying a force to the release mechanism from outside the casing, said separation mechanism separates the rotating drum from the ratchet mechanism, thus allowing the drum to rotate, releasing the tension on the chain and therefore releasing the brake mechanism of the railroad car.

The extreme low profile parking brake mechanism for railroad cars of the present invention will now be described with reference to a preferred embodiment thereof, wherein the same signs refer to the same elements of the figures shown.

Figure 3:
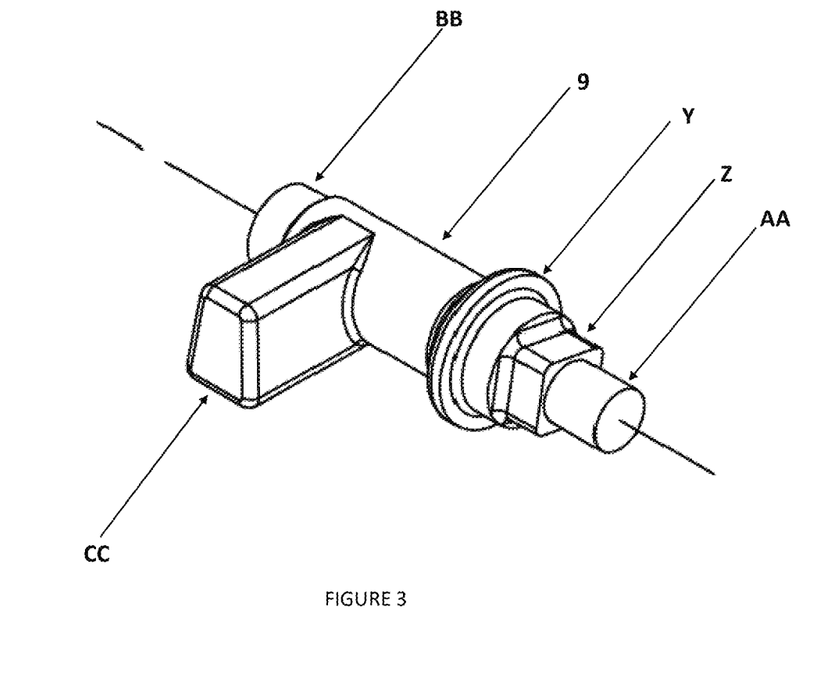
Figure 4:
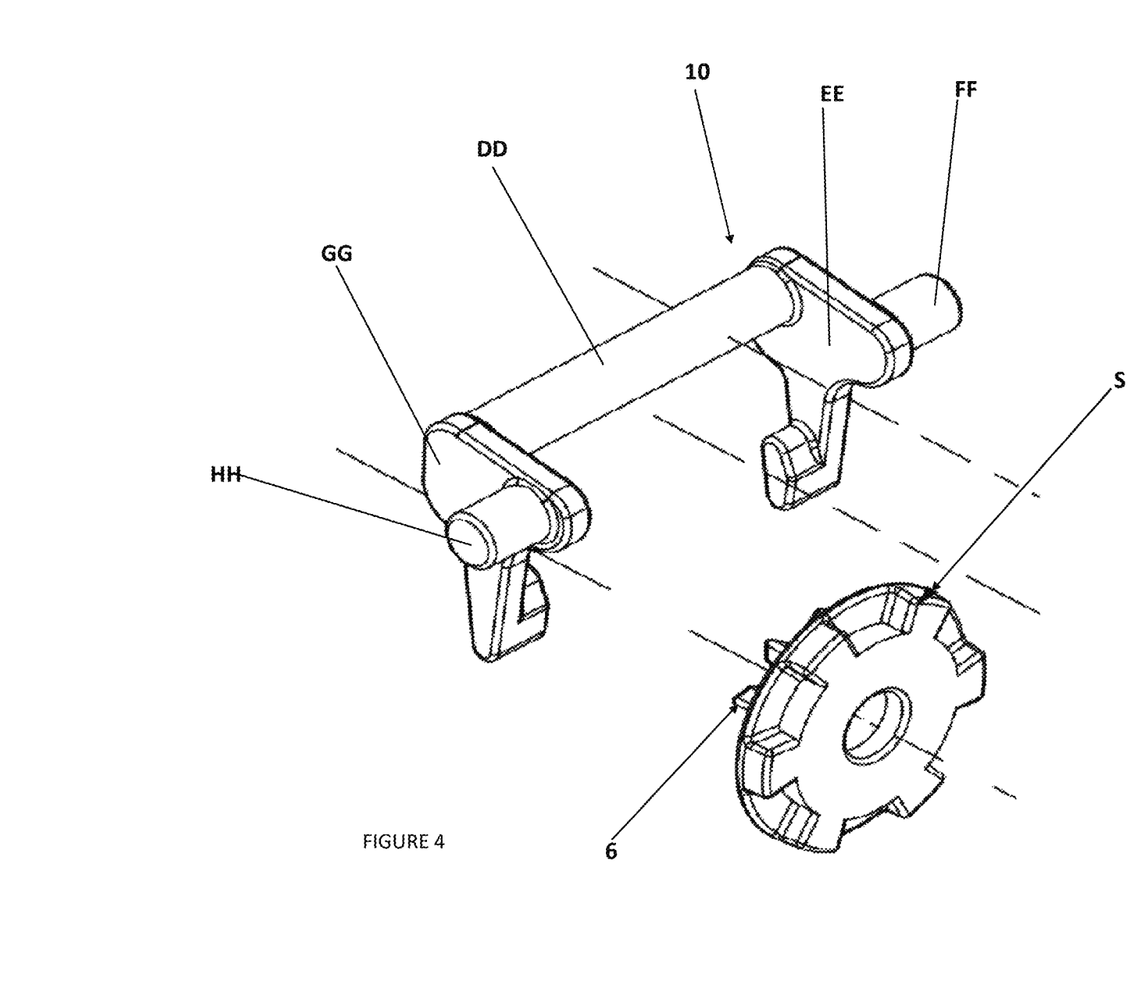

The extreme low profile parking brake mechanism for rail cars of the present invention comprises:

a low-profile housing (1) to contain the components of the parking brake mechanism, having:
  an inner face and an outer face;
  a first and a second side wall, an upper wall and a lower wall;
  a housing (not shown) formed on the inner face, located in an upper central portion of the housing, said housing having a main central circular opening (A);
  a pair of circular openings (B), (B') located on the same horizontal axis on the main central circular opening (A);
  a semi-cylindrical shaped housing in a central portion;
  a plurality of circular openings (C) located in a skirt (D) depending on the casing (1) and surrounding it;
  a first lateral circular opening (II) located in a middle portion of the first lateral wall of the casing (1);
  a second lateral circular opening (not shown) located in a middle portion of the second lateral wall of the housing (1);
  wherein the first lateral circular aperture (II) and the second lateral circular aperture lie on the same transverse longitudinal axis;
a rear cover plate (5), which has the same perimeter shape as the low profile casing (1), said rear cover plate having:
  a first wear plate (E) of circular shape located in a central portion of the rear cover plate (5), which has a semi-cylindrical shaped opening (F) that matches a similar opening located in the rear cover plate (5);
  a second oval-shaped wear plate (U) located in an upper portion of the rear cover plate (5), having: a first circular opening (V) that coincides with a similar opening located in the rear cover plate (5), and a second circular opening (W), smaller than the first circular opening (V) and located on it, which coincides with a similar opening located on the rear cover plate (5), and where the first opening circular (V) and the second circular opening (W) are aligned on the same vertical longitudinal axis inclined with respect to a vertical axis of the wear plate (U);
  a plurality of circular openings (G) that coincide with the plurality of circular openings (C) of the low-profile housing (1);
  wherein the rear cover plate (5) is attached to the low-profile housing (1) by a plurality of rivets (23), each passing through both, the circular opening (C) in the housing and a respective opening (G);
a handwheel (2.1), having: a front face and a rear face, a handle (LL), a plurality of spokes (MM) connected to a solid central portion (NN), a quadrangular-shaped central aperture (OO) and a plurality of openings (PP) surrounding the central opening in a quadrangular shape;
a handwheel wear plate (2.2) having a square-shaped central opening smaller than the square-shaped opening of the handwheel (2.1), a square frame (QQ) surrounding said square-shaped opening of the wear plate (2.2), a plurality of perforations (RR) surrounding the quadrangular frame, and wherein the handwheel wear plate (2.2) is attached to the rear face of the handwheel (2.1) by means of a plurality of bolts that pass through the plurality of perforations (RR) in the wear plate and handwheel (2.1) and where the square frame (QQ) fits tightly into the square opening (OO) of the handwheel (2.1) in such a way that the rear face of the handwheel (2.1) has a quadrangular opening defined by the handwheel wear plate (2.2);
a release lever (16), which has a circular head (SS) at one of its ends that defines an opening which houses a washer (15) that defines a central quadrangular release lever opening;
wherein the following elements are inside the casing:
  a main gear (4.1), which has an open central housing (TT) having a quadrangular shape;
  a chain drum (H), around which a chain (4.5) connected to the braking system of the railroad car can be wound, when rotating on its own axis, wherein the chain drum (H) has:
    a main drum member (I) comprising a hollow cylinder around which the chain (4.5) is wound, wherein said main drum member (I) has a first end and a second end;
    a shackle member (4.4), attached to a central portion of the main drum member (I), which receives a last link of the chain (4.5) between both ears of the shackle, wherein said last link of the chain (4.5) is connected to the shackle member by a chain pin (4.2) that passes through openings located in each ear of the shackle member (4.4) and through the last link of the chain (4.5) and where the chain pin (4.5) chain (4.2) is secured in place by means of a cotter pin (4.3) that passes through an opening located at one end of the chain pin (4.2);
    a guide member (J), which comprises an ear of semicircular shape that surrounds a portion of the circumference of the main drum member (I) near its second end, wherein said guide member has the function of serving as a stop and guide so that the chain (4.5) is properly wound on the central portion of the main drum member (I);
    a quadrangular shaped bearing member (K), which has a front circular opening that rotatably receives the main drum member (I), wherein said bearing member has a rear wall that has a semi-cylindrical shaped opening (not shown);
  a drum shaft (24), comprising an elongated semi-cylindrical member having a first end (L) and a second end (M), which passes through the main drum member (I) and through the semi-cylindrical shaped opening of the bearing member (K);
  wherein:
    the main gear (4.1) rotates on the wear plate (E);
    the bearing member (K) is housed in the open quadrangular housing (TT) of the main gear (4.1) without protruding from it; and
    the first end (L) of the drum shaft (24) is housed in the semi-cylindrical housing (which has a bushing) of the low profile casing (1) and the second end (M) of the drum shaft (24) is housed in the semi-cylindrical shaped housing (which has a bushing) of the wear plate (E);

the main drum member (I) can rotate around the drum shaft (24) and on the bearing member (K), which is held fixed, thereby pulling the chain (4.5) by the shackle member (4.4), which wraps around the main drum member (I) when it rotates;

The drum shaft does not rotate, because due to its shape, it has a flat face on it, which fits into the hubs with a square face on them;

a ratchet and clutch mechanism, which are normally associated to allow the main gear (4.1) to rotate, and whose elements are aligned and located on a lateral portion of the main gear (4.1);

wherein the ratchet mechanism comprising:

a bearing (1.1) located in the housing formed on the internal face of the casing;

a ratchet gear (2) having: a front face having: a cylindrical portion (N) protruding from the central portion of the ratchet gear (2), a quadrangular gripping portion (O) depending on the cylindrical portion and from which a front shaft protrudes comprising a screw (P), and said ratchet gear (2) having a rear face that has a cross-shaped mesh pattern (not shown) from which a rear shaft (Q) protrudes, wherein the quadrangular gripping portion (O) together with the screw (P) pass through the bearing (1.1) (which supports the rotation of the ratchet gear (2)) and trough the main central circular aperture (A) of the casing (1) and protrude from its external face;

a ratchet (12) actuated by a ratchet spring (14) which acts on the teeth of the ratchet gear blocking the rotation of the ratchet gear (2) in one direction, wherein:

the ratchet (12) has a circular opening in its main portion;

wherein the ratchet spring has two arms, one to exert pressure on the ratchet (12);

wherein the ratchet is attached to the housing (1) by a bolt that passes through the circular opening (B) of the housing (1), the circular opening of the ratchet, and the ratchet spring (14) and is secured by means of a cotter pin that passes through an opening located at the opposite end of the bolt head, thereby also securing the ratchet spring (14);

a clutch mechanism, comprising:

a connection plate (7), mounted on the rear shaft (Q) of the ratchet gear (2), where the connection plate has: a front face that has a cross-shaped housing (R) to receive the cross-shaped engagement pattern of the ratchet gear (2) and a rear face having an engagement pattern (not shown) formed on said rear face;

a dual gear (S) which has:

a front face having a meshing pattern (T) formed on said face, wherein said meshing pattern can mesh with the meshing pattern formed on the rear face of the connection plate (7); and a rear face that has a pinion gear (6), which meshes with the main gear (4.1);

a spring (8) located between the connection plate and the ratchet gear (2) surrounding the rear axle (Q) in such a way that said spring rests on the rear face of the ratchet gear and exerts pressure on the front face of the connection plate (7) pushing it against the dual gear (S) thereby meshing the engagement pattern on the back face of the connection plate (7) with the engagement pattern (T) on the back face of the dual gear (S) but without removing the cross-shaped gear pattern located on the rear face of the ratchet gear (2) from the cross-shaped housing (R) of the connection plate (7) in this way, keeping the permanently connected the ratchet gear (2) with the connection plate (7);

a bearing (5.1) housed in the first circular opening (W) of the second wear plate (U) of the rear cover plate (5), wherein the bearing 5.1 supports the rotation of the pinion gear (6);

a release mechanism, to push the clutch mechanism and release the main gear of the ratchet mechanism comprising:

a cam shaft (9) (FIG. 3) having:

a first end having a stop ring (Y), a quadrangular gripping portion (Z) and a front shaft comprising a screw (AA) in that order;

a second end having a second cylindrical shaft portion (BB); and a cam (CC) located near the second end of the cam shaft;

a double lever (10) (FIG. 4) comprising:

a connecting and pushing cross bar (DD);

a first lever member (EE), attached to a first end of the connecting and pushing cross bar (DD), having an internal and an external surface, wherein a first cylindrical shaft member (FF) protrudes from its external surface;

a second lever member (GG), attached to a second end of the connecting and pushing cross bar (DD), having an internal and an external surface, in which a second cylindrical shaft member (HH) protrudes from its external surface;

wherein both the first cylindrical shaft member (FF) and the second cylindrical shaft member (HH) lie on the same transverse horizontal axis, different from the horizontal axis of the connecting and pushing transverse bar (DD);

wherein both lever members (EE) and (GG) have thrust surfaces that contact the side edges of the connecting plate (7);

wherein the screw (AA) of the cam shaft (9) together with the quadrangular gripping portion (Z) pass through the circular opening (B') of the casing (1) as far as the stop ring (y), both elements (AA), (Z) protruding from the external face of the casing (1) and wherein the second cylindrical portion of the shaft (BB) of the cam shaft (9) is housed inside the second circular opening (W) of the second wear plate (U) thus allowing the cam shaft (9) to rotate on the first cylindrical shaft portion (AA) and the second cylindrical shaft portion (BB);

wherein the first cylindrical shaft member (FF) of the first lever member (EE) passes through the first circular lateral opening (II) of the housing (1) and is secured in position by a key (11) and the second cylindrical shaft member (HH) of the second lever member (GG) passes through the second circular side opening of the housing (1) and is secured in position by another key (11') in this way allowing both lever members (EE) and (HH) to pivot in said openings (II);

wherein the cam shaft (9) when rotating, causes the cam (CC) to move laterally, pushing down the connecting and pushing cross bar (DD) making in turn both lever members (EE) and (HH) to pivot in the openings (II) pushing the connecting plate (7) forward, compressing the spring (8) and disengaging the connection plate (7) from the dual gear (S) in this way allowing it to freely rotate together with the main gear (4.1) and with the chain drum (H) attached to it;

wherein the handwheel (2.1) is inserted into the quadrangular grip portion (O) together with the screw (P) of the ratchet gear (2) protruding from the outer face of the casing (1) through the circular opening (B) such that the screw (P)

passes through the central square opening defined by the handwheel wear plate (X) and the square grip portion (O) is housed within said central opening in a quadrangular shape. The handwheel (3.1) is fixed to the screw by means of a set of screw (21) and washer (20) secured by a cotter pin (22) placed at the end of the screw (P);

wherein the release lever (16) is inserted into the gripping quadrangular portion (Z) together with the screw (AA) of the cam shaft (9) that protrude from the external face of the casing (1) through the circular opening (B') in such a way that the screw (AA) passes through the quadrangular central opening defined by the washer (15) housed in the circular head of the release lever (16) and the quadrangular gripping portion (Z) is housed within the central quadrangular opening of the washer (15). The release lever (16) is fixed to the screw (AA) by means of a set of screw (18) and washer (17);

As the handwheel rotates, the quadrangular grip portion (O) housed within the quadrangular-shaped central aperture defined by the handwheel wear plate (X) also rotates, and in turn rotates all associated elements, specifically: the ratchet gear (2), the connecting plate (7), the dual gear (S), the main gear (4.1), and the chain drum (H) which tenses the chain attached to it when winding it, thus applying the brake system attached to the chain in park mode. The ratchet (12) acts on the teeth of the ratchet gear blocking the rotation of the ratchet gear (2) and all associated elements, preventing the chain from losing tension (4.5).

To release the rail car's brake system from parking mode, it is necessary to rotate the release lever (16) so that the cam shaft (9) attached to it also rotates and causes the cam (cc) to laterally move, pushing down the connecting and pushing cross bar (DD) making in turn both lever members (EE) and (HH) to pivot in the openings (II) and (JJ) pushing the connecting plate (7) forward, compressing the spring (8) and disengaging the connecting plate (7) of the dual gear (S) in this way allowing the dual gear (S) to rotate freely along with all associated elements, specifically: the gear main (4.1) and the chain drum (H), releasing the tension of the chain (4.5) and in this way releasing the braking system of the railway car parking brake mode.

Thanks to the reduced number of components and the configuration of said components, the parking brake mechanism of the present invention has such a thickness that it can be housed in a casing that does not exceed 6¼" in width counted from the side surface of the car, while meeting the same requirements for force, chain stroke length, and necessary force as the T-brake.

Figure 1:
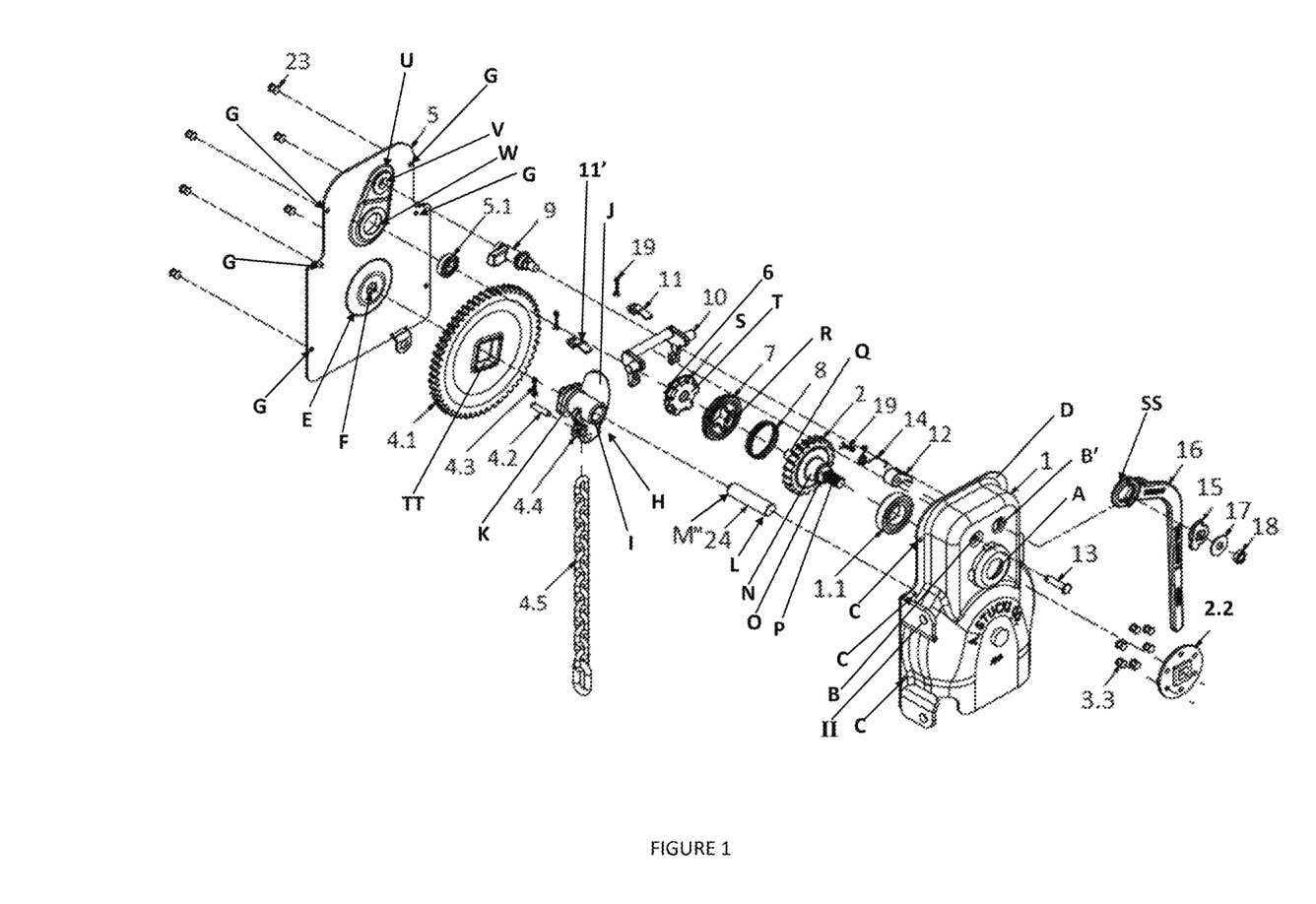
Figure 2:
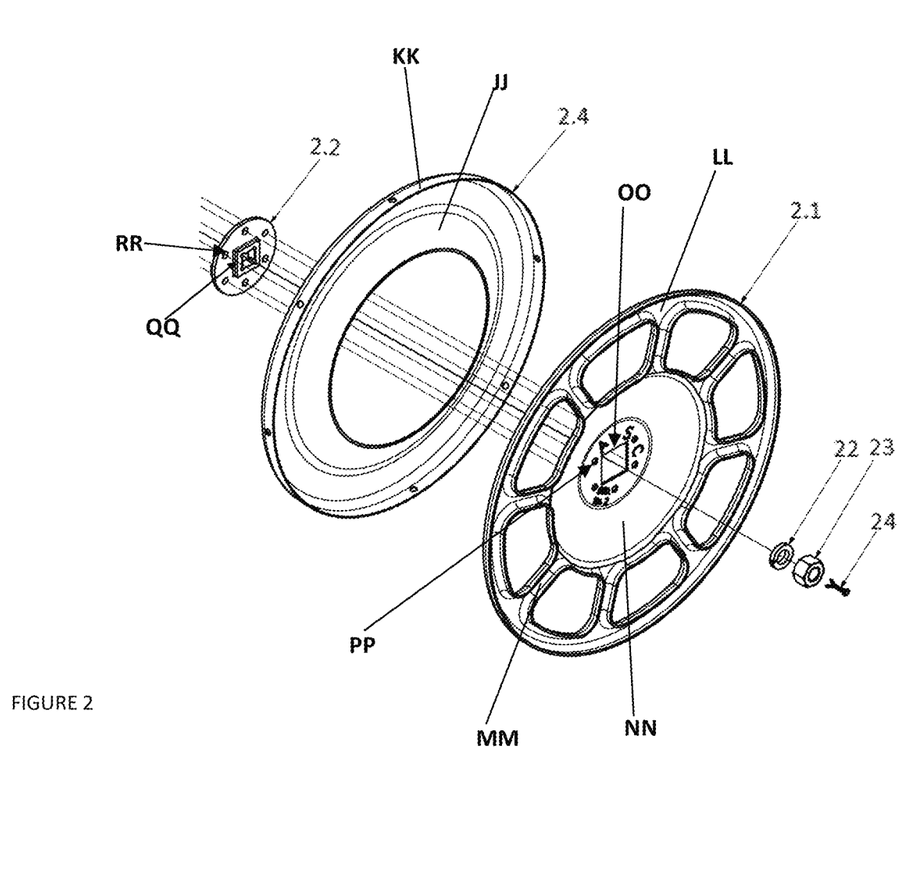

In another embodiment of the invention, (FIG. 2) the handwheel (2.1) has a guard (2.4) attached to the periphery of the rear face thereof, wherein said guard (2.4) comprises:

a cover plate (JJ) having a central opening that coincides with the solid central portion of the handwheel (3.1);

a peripheral ring (KK) attached to the periphery of the cover plate (JJ) in such way that the transverse axis of the peripheral ring (KK) is perpendicularly located to the radial axis of the cover plate (JJ);

wherein the peripheral ring (KK) is joined by welding or any other suitable means to the periphery of the handle of the handwheel (2.1), said peripheral ring (KK) separating the cover plate from the handle and from the plurality of spokes and creating an internal cavity on the rear face of the handwheel (2.1);

Said rear cover protects the operator's fingers when inserting the fingers between the spokes (MM) of the handwheel (2.1) to make it turn, preventing the fingers from being trapped between the spokes of the handwheel (2.1) and the external face of the casing (1).

The current standard calls for a distance between the handwheel and the brake body of 4 inches, this is indicated by the FRA (Federal Railroad Administration), who regulates the safety of the railways in their operation. Changing this rule would imply an act of the North American Congress for its change.

Thanks to said cover (2.4), it is not necessary to maintain a protective distance between the handwheel (2.1) and the external face of the casing (1), since the risk of a blow or entrapment no longer exists, because the cover prevents the contact of the hands against the external face of the casing (1), since the cover (2.4) rotates together with the handwheel and with the hands, making the rule unnecessary and allowing the width of the parking brake mechanism of the present invention to be further reduced.

Thanks to the specific configuration of the parking brake mechanism of the present invention and of the guard (2.4) it is possible to provide a casing and handwheel (2.1) that does not exceed 6¼ inches in width counted from the side surface of the car, thus meeting the requirements of the applicable normative specification defined by the AAR association itself and by the FRA regulations, fitting into the reduced space available for this brake on the same side of the car.

It should finally be understood that the extreme low profile parking brake mechanism for railroad cars of the present invention is not limited to the embodiment described above and that those skilled in the art will be enabled, by the teachings set forth herein, to effect changes in the extreme low profile parking brake mechanism for railroad cars of the present invention, the scope of which will be established exclusively by the following claims.

The invention claimed is:

1. A parking brake mechanism for railway cars, said mechanism being inside an internal cavity of a low profile housing that has a rear cover that closes said internal housing, wherein the mechanism allows applying a tension to a chain connected to the brake mechanism of a railroad car, wherein said parking brake mechanism comprises:

a low profile housing with a maximum thickness of 4 inches, configured to contain a main gear, a ratchet mechanism, a clutch mechanism, a release mechanism, and a rotating drum, wherein said low profile housing limits the vertical and horizontal space occupied by the mechanism;

wherein said main gear housed within the low profile housing and laterally aligned with the ratchet mechanism and the drum;

wherein said ratchet mechanism that can be rotated from the outside of the housing only in a single direction, wherein said ratchet mechanism is attached to the internal walls of the low profile housing, said ratchet mechanism having a ratchet gear that meshes with the main gear;

wherein said clutch mechanism associated with the ratchet mechanism and which can rotate together with the ratchet mechanism, said clutch mechanism having a connecting plate that is normally engaged with the ratchet gear;

wherein said release mechanism to push the connecting plate of the clutch mechanism and release the main gear of the ratchet mechanism comprising: a cam shaft, rotatably mounted within the low-profile housing, having a first end with a gripping portion and a cylindrical shaft portion protruding from the external face of the housing; a second end with a cylindrical shaft portion housed within the wear plate, enabling rotational movement of the cam shaft; a cam located near the second end, configured to provide lateral motion upon rotation of the cam shaft; a double lever assembly including a connecting and pushing cross bar; two lever members pivotally mounted on the housing and positioned on opposite sides of the connecting plate of the clutch mechanism; thrust surfaces on each lever member configured to contact and push the connecting plate; and operational interaction, wherein the cam shaft, when rotated, causes the cam to push the connecting and pushing cross bar, which pivots the lever members to actuate the connecting plate of the clutch mechanism, compressing a spring and disengaging the clutch mechanism from the main gear;

wherein said rotating drum coupled to a chain normally in contact and associated with the ratchet mechanism through the clutch mechanism and attached to the main gear, wherein one end of said chain is attached to the rotating drum, around which it is wound, thus tensioning the entire chain and actuating the brake mechanism connected to an opposite end of the chain, wherein the rotating drum includes a guide member to keep the chain in position and within the profile of the low profile housing;

wherein when the main gear rotates, the rachet mechanism, the clutch mechanism and the drum mechanism also rotate;

wherein the ratchet mechanism associated with the clutch mechanism and the drum allows the drum to rotate in one direction by winding the chain on it, applying tension to the chain and applying the brake mechanism of the railway car, preventing it from being released; and wherein by applying a force to the release mechanism from outside the casing, said release mechanism separates the rotating drum from the ratchet mechanism, thus allowing the drum to rotate, releasing the tension on the chain and therefore releasing the brake mechanism of the railroad car.

2. A parking brake mechanism according to claim 1, wherein the ratchet mechanism can be rotated from outside the housing by a handwheel, wherein the handwheel comprises:

a front face and a rear face, a lug (LL), a plurality of spokes (MM) connected to a solid central portion (NN), a quadrangular-shaped central aperture (OO) which is attached to an axis of the gear ratchet (2); and wherein the handwheel (2.1) comprises a guard (2.4) attached to the periphery of its rear face, said guard (2.4) forming an internal cavity on the back face of the handwheel (2.1) that is configured to receive fingers inserted between the spokes (MM) of the handwheel (2.1) and to prevent such fingers from being trapped between the spokes (MM) of the handwheel (2.1) and an external face of the housing (1).

3. A parking brake mechanism according to claim 1, wherein the ratchet mechanism can be rotated from outside the housing by a handwheel, wherein the handwheel comprises:

a front face and a rear face, a handle (LL), a plurality of spokes (MM) connected to a solid central portion (NN), a quadrangular-shaped central aperture (OO), and a plurality of apertures (PP) surrounding the central opening in a quadrangular shape;

a handwheel wear plate (2.2) having a square-shaped central opening smaller than the square-shaped opening of the handwheel (2.1), a square frame (QQ) surrounding said square-shaped opening of the wear plate (2.2), a plurality of perforations (RR) surrounding the quadrangular frame, and wherein the handwheel wear plate (2.2) is attached to the rear face of the handwheel (2.1) by means of a plurality of bolts that pass through the plurality of perforations (RR) in the wear plate and handwheel (2.1) and wherein the square frame (QQ) fits tightly into the square opening (OO) of the handwheel (2.1) in such a way that the rear face of the handwheel (2.1) has a quadrangular opening defined by the handwheel wear plate (2.2) which receives a shaft of the ratchet gear (2);

and wherein the handwheel (2.1) has a guard (2.4) attached to the periphery of the rear face thereof, wherein said guard (2.4) comprises:

a cover plate (JJ) having a central opening that coincides with the solid central portion of the handwheel (3.1);

a peripheral ring (KK) attached to the periphery of the cover plate (JJ) in such a way that the transverse axis of the peripheral ring (KK) is perpendicular to the radial axis of the cover plate (JJ);

wherein the peripheral ring (KK) is joined to the periphery of the handle of the handwheel (2.1), said peripheral ring (KK) separating the cover plate from the handle and from the plurality of spokes and creating an internal cavity on the rear face of the handwheel (2.1); and wherein said rear cover protect fingers introduced between the spokes (MM) of the handwheel (2.1) to make it turn, preventing said fingers from being trapped between the spokes of the handwheel (2.1) and an external face of the casing (1).

4. A parking brake mechanism according to claim 1 wherein the low profile housing comprises:

an inner face and an outer face;

a first and a second side wall, an upper wall and a lower wall;

a cavity formed on the inner face, located in an upper central portion of the low profile housing, said low profile housing having a main central circular opening (A);

a pair of circular openings (B), (B') located on the same horizontal axis on the main central circular opening (A);

a semi-cylindrical shaped housing at a central portion;

a plurality of circular openings (C) located at a skirt (D) depending on the low profile housing and surrounding it;

a first lateral circular opening (II) located at a middle portion of the first side wall of the low profile housing;

a second lateral circular opening located at a middle portion of the second side wall of the low profile housing;

wherein the first lateral circular opening (II) and the second lateral circular opening lie on the same transverse longitudinal axis;

a rear cover plate (5), which has the same perimeter shape as the low profile housing, said rear cover plate having:

a wear plate (E) of circular shape located at a central portion of the rear cover plate (5), which has a semi-cylindrical shaped opening (F) that matches a similar opening located at the rear cover plate (5);

an oval-shaped wear plate (U) located at an upper portion of the rear cover plate (5), having: a first circular opening (V) that coincides with a similar opening located at the rear cover plate (5), and a second circular opening (W), smaller than the first circular opening (V) and located on it, which coincides with a similar opening located at the rear cover plate (5), and wherein the first circular opening (V) and the second circular opening (W) are aligned on the same vertical longitudinal axis inclined with respect to a vertical axis of the wear plate (U);

a plurality of circular openings (G) that coincide with the plurality of circular openings (C) of the low profile housing;

wherein the rear cover plate (5) is attached to the low profile housing by a plurality of rivets (23), each passing through both the plurality of circular openings (C) located at a skirt (D) and through the plurality of circular openings (G) that coincide with the plurality of circular openings (C).

5. A parking brake mechanism according to claim 1 wherein the ratchet mechanism comprises:

a bearing (1.1) located in the housing formed on an internal face of the casing;

the ratchet gear having: a front face having: a cylindrical portion (N) protruding from the central portion of the ratchet gear (2), a quadrangular gripping portion (O) depending on the cylindrical portion and from which a front shaft protrudes, comprising a screw (P), and said ratchet gear (2) having a rear face that has a cross-shaped mesh pattern from which a rear shaft (Q) protrudes, wherein the quadrangular gripping portion (O) together with the screw (P) pass through the bearing (1.1), which supports the rotation of the ratchet gear (2), and a main central circular opening (A) of the housing (1) and protrude from its external face;

a ratchet (12) actuated by a ratchet spring (14) which acts on the teeth of the ratchet gear (2) blocking the rotation of the ratchet gear (2) in one direction, wherein:

the ratchet (12) has a circular opening at its main portion;

wherein the ratchet spring (14) has two arms, to exert pressure on the ratchet (12);

wherein the ratchet is attached to the housing (1) by a bolt having a head at one end, the bolt passing through a circular opening (B) of the housing (1), the circular opening of the ratchet, and the ratchet spring (14) and wherein the opposite end of the bolt (i.e., the end opposite the head) is secured by means of a cotter pin that passes through an opening located at said opposite end, thereby also securing the ratchet spring (14).

6. A parking brake mechanism according to claim 1 wherein the clutch mechanism associated with the ratchet mechanism comprises:

the connecting plate (7), said connecting plate (7) mounted on a rear shaft (Q) of the ratchet gear (2), and having: a front face that has a cross-shaped housing (R) to receive a cross-shaped mesh pattern of the ratchet gear (2) and a rear face having a connecting plate rear face mesh pattern formed on said rear face;

a dual gear(S) having:

a front face having a front face dual gear meshing pattern (T) formed on said face, wherein said front face dual gear meshing pattern (T) can mesh with the connecting plate rear face mesh pattern; and a rear face that has a pinion gear (6), which meshes with the main gear (4.1);

a spring (8) located between the connecting plate (7) and the ratchet gear (2) surrounding a rear axle (Q) in such a way that said spring rests on the rear face of the ratchet gear (2) and exerts pressure on the front face of the connecting plate (7) pushing it against the dual gear(S) thereby meshing the connecting plate rear face mesh pattern with the front face dual gear meshing pattern (T) but without removing the cross-shaped gear pattern located on the rear face of the ratchet gear (2) from the cross-shaped housing (R) of the connecting plate (7) in this way, keeping connected the ratchet gear (2) with the connecting plate (7).

7. A parking brake mechanism according to claim 1 wherein the release mechanism comprises:

a cam shaft (9) having: a first end having a stop ring (Y), a quadrangular gripping portion (Z) and a front shaft comprising a first cylindrical shaft portion (AA) in that order;

a second end having a second cylindrical shaft portion (BB); and a cam (CC) located near the second end of the cam shaft (9);

a double lever (10) comprising:

a connecting and pushing cross bar (DD);

a first lever member (EE), attached to a first end of the connecting and pushing cross bar (DD), having an internal and an external surface, wherein a first cylindrical shaft member (FF) protrudes from its external surface;

a second lever member (GG), attached to a second end of the connecting and pushing cross bar (DD), having an internal and an external surface, in which a second cylindrical shaft member (HH) protrudes from its external surface;

wherein both the first cylindrical shaft member (FF) and the second cylindrical shaft member (HH) lie on the same transverse horizontal axis, different from the horizontal axis of the connecting and pushing transverse bar (DD);

wherein both lever members (EE) and (GG) have thrust surfaces that contact the side edges of the connecting plate (7);

wherein the first cylindrical shaft portion (AA) of the cam shaft (9) together with the quadrangular gripping portion (Z) pass through the circular openings (B') of the low profile housing (1) as far as the stop ring (y), both elements, the first cylindrical shaft portion (AA) and the quadrangular gripping portion (Z) protruding from the external face of the low profile housing (1) and wherein the second cylindrical portion of the shaft (BB) of the cam shaft (9) is housed inside the second circular opening (W) of the oval-shaped wear plate (U) thus allowing the cam shaft (9) to rotate on the first cylindrical shaft portion (AA) and the second cylindrical shaft portion (BB);

wherein the first cylindrical shaft member (FF) of the first lever member (EE) passes through the first lateral circular opening (II) of the low profile housing (1) and is secured in position by a key (11) and the second cylindrical shaft member (HH) of the second lever member (GG) passes through the second lateral circular opening of the low profile housing (1) and is secured in position by another key (11') in this way allowing both lever members (EE) and (HH) to pivot in the first lateral circular opening (II) and in the second lateral circular opening;

wherein the cam shaft (9) when rotating, causes the cam (CC) to laterally move, pushing down the connecting and pushing cross bar (DD) making in turn both lever members (EE) and (HH) to pivot in the first lateral circular opening (II) and in the second lateral circular opening pushing the connecting plate (7) of the clutch mechanism forward, compressing the spring (8) thus releasing the main gear of the ratchet mechanism allowing it to freely rotate together with the main gear (4.1) and with the chain drum (H) attached to it.

8. A parking brake mechanism according to claim 6 wherein the release mechanism comprises:
a cam shaft (9) having:
a first end having a stop ring (Y), a quadrangular gripping portion (Z) and a front shaft comprising a first cylindrical shaft portion (AA) in that order;
a second end having a second cylindrical shaft portion (BB); and
a cam (CC) located near the second end of the cam shaft (9);
a double lever (10) comprising:
a connecting and pushing cross bar (DD);
a first lever member (EE), attached to a first end of the connecting and pushing cross bar (DD), having an internal and an external surface, wherein a first cylindrical shaft member (FF) protrudes from its external surface;
a second lever member (GG), attached to a second end of the connecting and pushing cross bar (DD), having an internal and an external surface, in which a second cylindrical shaft member (HH) protrudes from its external surface;
wherein both the first cylindrical shaft member (FF) and the second cylindrical shaft member (HH) lie on the same transverse horizontal axis, different from the horizontal axis of the connecting and pushing transverse bar (DD);
wherein both lever members (EE) and (GG) have thrust surfaces that contact the side edges of the connecting plate (7);
wherein the first cylindrical shaft portion (AA) of the cam shaft (9) together with the quadrangular gripping portion (Z) pass through the circular openings (B') of the low profile housing (1) as far as the stop ring (y), both elements the first cylindrical shaft portion (AA) and the quadrangular gripping portion (Z) protruding from the external face of the lower profile housing (1) and wherein the second cylindrical portion of the shaft (BB) of the cam shaft (9) is housed inside the second circular opening (W) of the oval-shaped wear plate (U) thus allowing the cam shaft (9) to rotate on the first cylindrical shaft portion (AA) and the second cylindrical shaft portion (BB);
wherein the first cylindrical shaft member (FF) of the first lever member (EE) passes through the first lateral circular opening (II) of the low profile housing (1) and is secured in position by a key (11), and the second cylindrical shaft member (HH) of the second lever member (GG) passes through the second lateral circular opening of the low profile housing (1) and is secured in position by another key (11') in this way allowing both lever members (EE) and (HH) to pivot in the first lateral circular opening (II) and in the second lateral circular opening;
wherein the cam shaft (9) when rotating, causes the cam (CC) to laterally move, pushing down the connecting and pushing cross bar (DD) making in turn both lever members (EE) and (HH) to pivot in the first lateral circular opening (II) and in the second lateral circular opening pushing the connecting plate (7) of the clutch mechanism forward, compressing the spring (8) and disengaging the connecting plate (7) from the dual gear(S) allowing it to freely rotate together with the main gear (4.1) and with the chain drum (H) attached to it.

9. A parking brake mechanism according to claim 1 wherein the rotating drum comprises:
a main drum member (I) comprising a hollow cylinder around which the chain (4.5) is wound, wherein said main drum member (I) having a first end and a second end;
a shackle member (4.4), attached to a central portion of the main drum member (I), which receives a last link of the chain (4.5) between both ears of the shackle, wherein said last link of the chain (4.5) is connected to the shackle member by a chain pin (4.2) that passes through openings located in each ear of the shackle member (4.4) and through the last link of the chain (4.5) and wherein the chain pin (4.2) is secured in place by means of a cotter pin (4.3) that passes through an opening located at one end of the chain pin (4.2);
the guide member (J), which comprises an ear of semicircular shape that surrounds a portion of the circumference of the main drum member (I) near its second end, wherein said guide member has the function of serving as a stop and guide so that the chain (4.5) is properly wound on the central portion of the main drum member (I);
a quadrangular shaped bearing member (K), which has a front circular opening that rotatably receives the main drum member (I), wherein said bearing member has a rear wall that has a semi-cylindrical shaped opening;
a drum shaft (24), comprising an elongated semi-cylindrical member having a first end (L) and a second end (M), which passes through the main drum member (I) and through the semi-cylindrical shaped opening of the bearing member (K);
wherein:
the bearing member (K) is housed in an open quadrangular housing (TT) of the main gear (4.1) without protruding from it; and
the first end (L) of the drum shaft (24) is housed in a semi-cylindrical shaped housing of the low profile housing (1) that has a bushing, and the second end (M) of the drum shaft (24) is housed in a housing that has a semi-cylindrically shaped bushing of a wear plate (E) located in the low profile housing (1);
the main drum member (I) can rotate around the drum shaft (24) and on the bearing member (K), which is held fixed, thereby pulling the chain (4.5) by the shackle member (4.4), which wraps around the main drum member (I) when it rotates.

\* \* \* \* \*